US010037347B2

United States Patent
Saha et al.

(10) Patent No.: US 10,037,347 B2
(45) Date of Patent: Jul. 31, 2018

(54) METHODS FOR RECONCILING TRANSACTIONS AND DEVICES THEREOF

(71) Applicant: Infosys Limited, Bangalore (IN)

(72) Inventors: Santanu Saha, Kolkata (IN);
Pritamjeet Sarangi, Bhubaneswar (IN);
Ashwin Repakula Nagaraj, Bangalore (IN); Mousum Kumar, Howrah (IN);
Sanat Kanungo, Cuttack (IN);
Annapurna Samanta, Dhenkanail (IN);
Kaushik Ghosh, Kolkata (IN);
Suryanarayan Panda, Bhubaneswar (IN)

(73) Assignee: Infosys Limited, Bangalore (IN)

( * ) Notice: Subject to any disclaimer, the term of this patent is extended or adjusted under 35 U.S.C. 154(b) by 468 days.

(21) Appl. No.: 14/624,237

(22) Filed: Feb. 17, 2015

(65) Prior Publication Data

US 2015/0261826 A1 Sep. 17, 2015

(30) Foreign Application Priority Data

Mar. 13, 2014 (IN) .......................... 1333/CHE/2014

(51) Int. Cl.
*G06F 17/30* (2006.01)

(52) U.S. Cl.
CPC .............. *G06F 17/30303* (2013.01)

(58) Field of Classification Search
CPC . G06F 17/30303; G06F 17/30578; G06F 1/04
USPC ................. 707/694; 705/14.23, 21, 39, 302
See application file for complete search history.

(56) References Cited

U.S. PATENT DOCUMENTS

| 7,194,481 B1 * | 3/2007 | Van Roon .............. G06Q 30/08 |
| 7,302,408 B2 | 11/2007 | Engdahl et al. |
| 7,403,917 B1 * | 7/2008 | Larsen ................... G06Q 30/06 |
| | | 705/30 |

(Continued)

FOREIGN PATENT DOCUMENTS

AU       2007240205 A1       7/2008

OTHER PUBLICATIONS

"Citi Unveils Simpler, Automated Way to Reconcile Transactions and Avoid Exceptions", retrieved from CitiConnect Straight-Through Reconciliation eliminates manual interventions, and speeds up cash applications on Feb. 16, 2015 (2011).

(Continued)

*Primary Examiner* — Hanh Thai
(74) *Attorney, Agent, or Firm* — LeClairRyan PLLC (57) ABSTRACT

A method for reconciling transactions iteratively by segregating data into homogeneous data sets. The method includes acquiring transactions from two or more systems and comparing with a set of configurable predefined matching rules. Applying, based on the result of the comparison, one or more rules on the acquired transactions. The transactions of the two or more systems are scanned and a user defined function is applied on the transactions of the two systems. A value of the user defined function is calculated. If the value of the user defined function is residual value, a configurable criteria is applied on the value of the user defined function. A residual transaction is created in one of the systems and the value of the user defined function is recalculated. If the value of the user defined function is null value, indicates the transactions are reconciled.

21 Claims, 3 Drawing Sheets

(56) References Cited

U.S. PATENT DOCUMENTS

| | | | | |
|---|---|---|---|---|
| 7,526,494 B2* | 4/2009 | Rom | ................... | G06Q 30/00 |
| 8,103,561 B2* | 1/2012 | Chung | ................... | G06Q 40/00 |
| | | | | 705/30 |
| 8,175,943 B1* | 5/2012 | Pathak | ................... | G06Q 10/087 |
| | | | | 705/1.1 |
| 8,326,754 B2* | 12/2012 | Bandych | ................... | G06Q 20/102 |
| | | | | 705/30 |
| 8,332,287 B2 | 12/2012 | Gee et al. | | |
| 8,639,596 B2* | 1/2014 | Chew | ................... | G06Q 40/00 |
| | | | | 705/30 |
| 8,706,758 B2* | 4/2014 | Chew | ................... | G06F 17/30578 |
| | | | | 705/30 |
| 2003/0084053 A1* | 5/2003 | Govrin | ................... | G06F 17/30592 |
| 2003/0195836 A1* | 10/2003 | Hayes | ................... | G06Q 20/102 |
| | | | | 705/37 |
| 2005/0108414 A1* | 5/2005 | Taylor | ................... | H04L 29/06027 |
| | | | | 709/231 |
| 2008/0147530 A1* | 6/2008 | Kwan | ................... | G06F 21/10 |
| | | | | 705/34 |
| 2008/0177656 A1* | 7/2008 | Sun | ................... | G06Q 20/02 |
| | | | | 705/39 |
| 2010/0063903 A1* | 3/2010 | Whipple | ................... | G06Q 20/40 |
| | | | | 705/30 |
| 2010/0153241 A1 | 6/2010 | Rucker et al. | | |
| 2010/0217692 A1* | 8/2010 | Goodbody | ................... | G06Q 10/087 |
| | | | | 705/28 |
| 2011/0016008 A1* | 1/2011 | Maraz | ................... | G06Q 20/202 |
| | | | | 705/21 |
| 2013/0198093 A1* | 8/2013 | Taylor, III | ................... | G06Q 50/18 |
| | | | | 705/311 |
| 2014/0058909 A1* | 2/2014 | Lobana | ................... | G06Q 40/00 |
| | | | | 705/30 |
| 2014/0188675 A1* | 7/2014 | Brown | ................... | G06Q 40/12 |
| | | | | 705/30 |
| 2014/0279304 A1* | 9/2014 | Lall | ................... | G06Q 40/12 |
| | | | | 705/30 |

OTHER PUBLICATIONS

SAP Help Portal, "CIF Comparison/Reconciliation of Transaction Data", retrieved from CIF Comparison/Reconciliation of Transaction Data on Feb. 16, 2015.

SAP Community Network, "CIF Comparison/Reconciliation", retrieved from CIF Comparison/Reconciliation on Feb. 17, 2015.

* cited by examiner

METHODS FOR RECONCILING TRANSACTIONS AND DEVICES THEREOF

This application claims the benefit of Indian Patent Application No. 1333/CHE/2014 filed Mar. 13, 2014, which is hereby incorporated by reference in its entirety.

FIELD

The present disclosure relates generally to field of data reconciliation and in particular, to a system and method and/or apparatus for reconciling transactions iteratively by segregating the data into homogeneous data sets.

BACKGROUND

Presently, reconciliation systems allow matching of homogenous data with a pre-defined fixed set of matching rules. The pre-defined fixed sets of matching rules may get applied on the entire set of data within a defined reconciliation scope. Therefore, when heterogeneous data is received as part of the input to reconciliation processes, current reconciliation systems may be unable to handle that as part of a singular reconciliation setup. Current reconciliation systems may attempt to find a complete match between existing sets of transactions of reconciling systems. If a complete match is not found, then the associated unmatched transactions may be presented as exceptions. Operational personnel may need to manually process said exceptions to resolve a mismatch.

SUMMARY

Disclosed are a method, an apparatus and/or a system for reconciling transactions iteratively by segregating data into homogeneous data sets.

In one aspect, a method includes acquiring transactions from two or more systems through a computer network. A set of configurable matching rules are defined and the set of configurable matching rules are compared with the acquired transaction(s), through a processor. Based on the result of the comparison, one or more rule associated with the set of configurable matching rules is applied on the acquired transaction through a processor. The transactions of the two or more systems are scanned through a processor and a user defined function is applied on the transactions of the two systems, through a processor. A value of the user defined function is calculated through a processor. The value of the user defined function is one of a null value and a residual value.

Upon the value of the user defined function is residual value, a configurable criteria is applied on the value of the user defined function through a processor. A residual transaction is created in one of the systems and the value of the user defined function is recalculated through a processor.

Upon the value of the user defined function is null value, indicates the transactions are reconciled.

In an additional embodiment, a system for reconciling transactions iteratively by segregating the data into homogeneous data sets is disclosed. The system includes, an acquisition module, a configuration module, a comparison module, a rule engine, a scanner, an implementation engine, a calculator, a criteria applier, a residual transaction creator and a reconciler. The acquisition module is configured to acquire transactions from two or more systems. The configuration module is configured to define a set of configurable matching rules. The comparison module is configured to compare an acquired transaction and against the set of configurable matching rules. Based on the comparison, the rule engine is configured to apply one or more rules associated with the set of configurable matching rules. The scanned is configured to scan the transactions of the two or more systems. The implementation engine is configured to apply a user defined function on the transaction of the two or more systems. A calculator is configured to calculate a value of the user defined function. The value of the user defined function is one of a null value and a residual value.

Upon the value of the user defined function is residual value, a criteria applier is configured to apply a configurable criteria on the value of the user defined function. The residual transaction creator is configured to create a residual transaction in one of systems and recalculating another value of the user defined function.

Upon the value of the user defined function is null value, a reconciler is configured to reconcile the transaction of the two or more systems.

In another embodiment, a computer readable storage medium for reconciling transactions iteratively by segregating the data into homogeneous data sets is disclosed. The computer readable storage medium acquiring transactions from two or more systems, defining a set of configurable matching rules, comparing an acquired transaction against the set of configurable matching rules, applying one or more rules associated with the set of configurable matching rules based on the comparison, scanning the transactions of the two or more systems, applying a user defined function on the transactions of the two or more systems, calculating a value of the user defined function. The value of the user defined function is one of a null value and a residual value.

Upon the value of the user defined function is the residual value, applying a configurable criteria on the value of the user defined function, creating a residual transaction in one of the systems, recalculating another value of the user defined function.

Upon the value of the user defined function is a null value, reconciling the transactions from the two or more systems.

BRIEF DESCRIPTION OF THE FIGURES

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Example embodiments, as described below, may be used to provide a method, an apparatus and/or a system of enhancing understandability of code using code clones. Although the present embodiments have been described with reference to specific example embodiments, it will be evident that various modifications and changes may be made to these embodiments without departing from the broader spirit and scope of the various embodiments.

Figure 1:
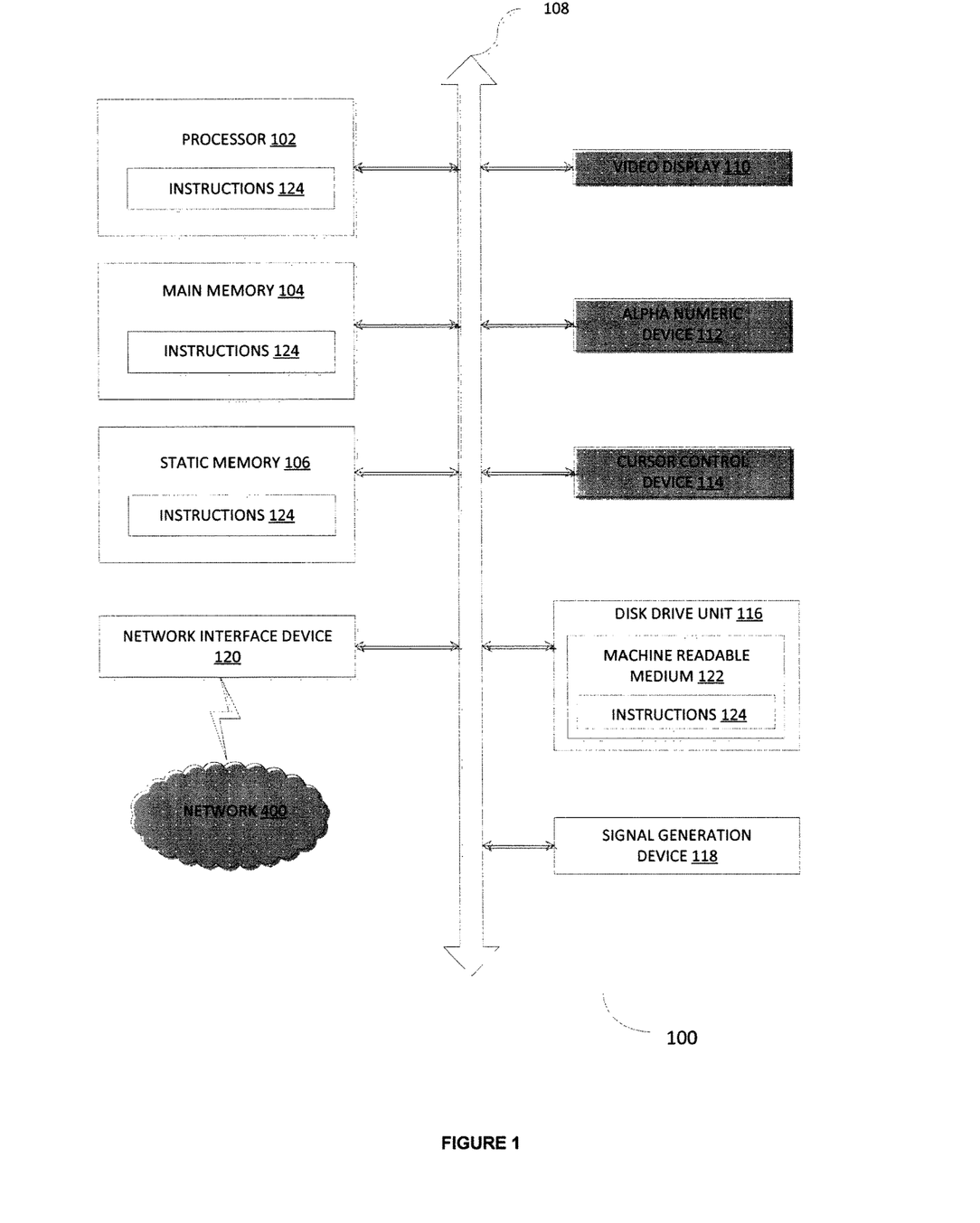
FIG. 1 is a diagrammatic representation of a data processing system capable of processing a set of instructions to perform any one or more of the methodologies herein, according to one embodiment.

FIG. 1 is a diagrammatic representation of a data processing system capable of processing a set of instructions to perform any one or more of the methodologies herein, according to one embodiment. FIG. 1 shows a diagrammatic representation of machine in the example form of a transaction processing computing device 100 within which a set of instructions, for causing the machine to perform any one or more of the methodologies discussed herein, may be executed. In various embodiments, the machine operates as a standalone device and/or may be connected (e.g., networked) to other machines.

In a networked deployment, the machine may operate in the capacity of a server and/or a client machine in server-client network environment, and/or as a peer machine in a peer-to-peer (or distributed) network environment. The machine may be a personal-computer (PC), a tablet PC, a set-top box (STB), a Personal Digital Assistant (PDA), a cellular telephone, a web appliance, a network router, switch and/or bridge, an embedded system and/or any machine capable of executing a set of instructions (sequential and/or otherwise) that specify actions to be taken by that machine. Further, while only a single machine is illustrated, the term "machine" shall also be taken to include any collection of machines that individually and/or jointly execute a set (or multiple sets) of instructions to perform any one and/or more of the methodologies discussed herein.

The example transaction processing transaction processing computing device 100 includes a processor 102 (e.g., a central processing unit (CPU) a graphics processing unit (GPU) and/or both), a main memory 104 and a static memory 106, which communicate with each other via a bus 108. The transaction processing transaction processing computing device 100 may further include a video display unit 110 (e.g., a liquid crystal displays (LCD) and/or a cathode ray tube (CRT)). The transaction processing transaction processing computing device 100 also includes an alphanumeric input device 112 (e.g., a keyboard), a cursor control device 114 (e.g., a mouse), a disk drive unit 116, a signal generation device 118 (e.g., a speaker) and a network interface device 120.

The disk drive unit 116 includes a machine-readable medium 122 on which is stored one or more sets of instructions 124 (e.g., software) embodying any one or more of the methodologies and/or functions described herein. The instructions 124 may also reside, completely and/or at least partially, within the main memory 104 and/or within the processor 102 during execution thereof by the transaction processing computing device 100, the main memory 104 and the processor 102 also constituting machine-readable media.

The instructions 124 may further be transmitted and/or received over a network 126 via the network interface device 120. While the machine-readable medium 122 is shown in an example embodiment to be a single medium, the term "machine-readable medium" should be taken to include a single medium and/or multiple media (e.g., a centralized and/or distributed database, and/or associated caches and servers) that store the one or more sets of instructions. The term "machine-readable medium" shall also be taken to include any medium that is capable of storing, encoding and/or carrying a set of instructions for execution by the machine and that cause the machine to perform any one or more of the methodologies of the various embodiments. The term "machine-readable medium" shall accordingly be taken to include, but not be limited to, solid-state memories, optical and magnetic media, and carrier wave signals.

Exemplary embodiments of this technology provide a system, method and/or apparatus for reconciling transactions iteratively by segregating data into homogeneous data sets. The system, method and/or apparatus for reconciling transactions iteratively by automatically segregating the data into homogeneous data sets involves acquiring transactions from systems involved in reconciliation process. A set of configurable matching rules may be defined during the reconciliation process. The set of configurable matching rules may depend on a user defined condition. The set of configurable matching rules may be compared with acquired transactions. Based on the comparison, one of the rules in the set may be applied on the transactions. The transactions are scanned and a user defined function may be applied on the scanned transactions. A value of the user defined function may be calculated where the value may be a null value and/or a residual value. The transactions may be reconciled if the value of the user defined function is the null value. If the value of the user defined function is the residual value, a configurable criteria may be defined during the reconciliation process. The configurable criteria is applied on the value of the user defined function and a residual transaction may be created. The residual transaction may be sent to one of the systems. The method for reconciling transactions may be repeated till the value of the user defined function is the null value.

Figure 2:
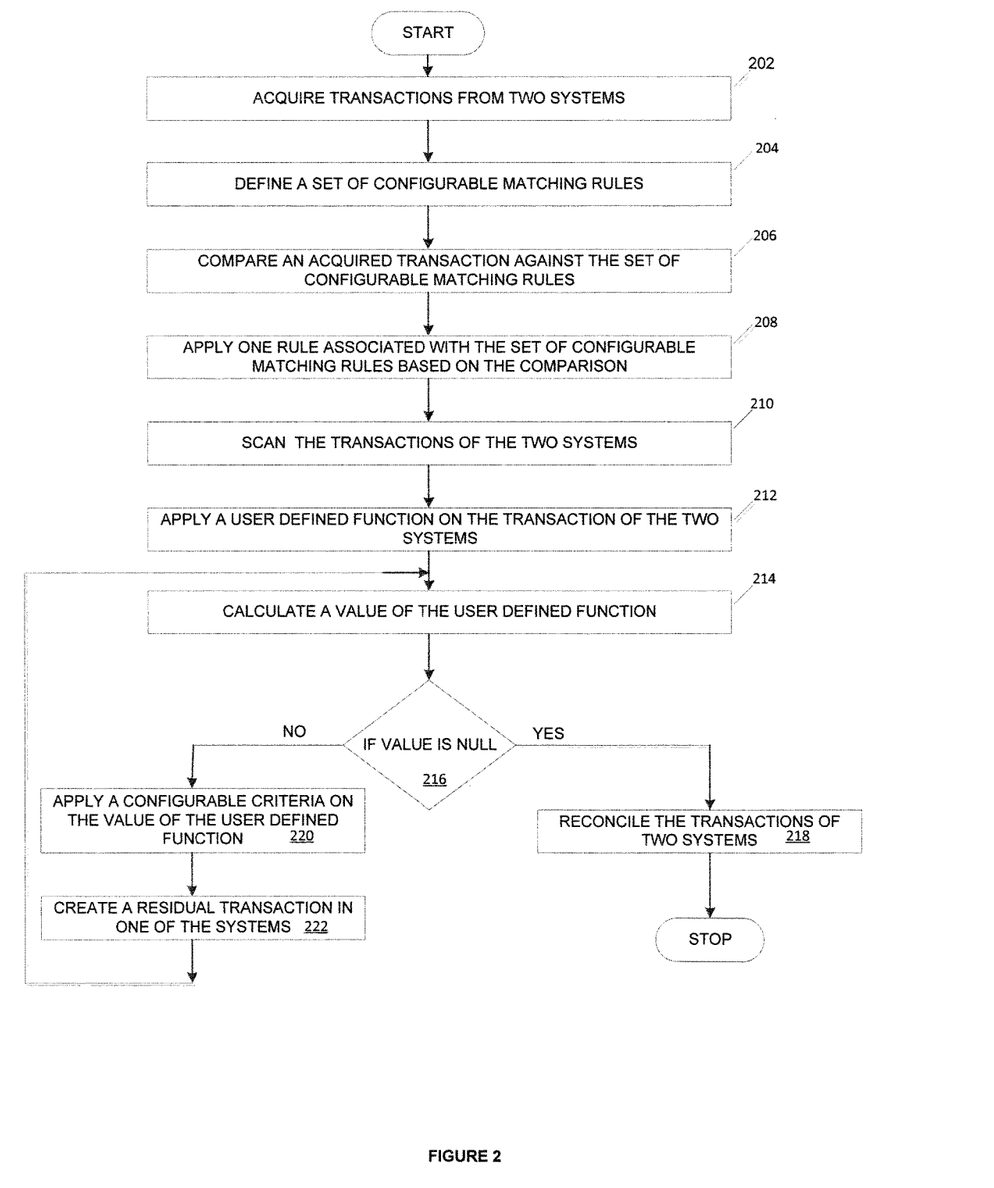
FIG. 2 is a flowchart, illustrating method for reconciling transactions iteratively by segregating the data into homogeneous data sets according to one or more embodiments.

FIG. 2 is a flow chart, illustrating a method for reconciling transactions iteratively by segregating the data into homogeneous data sets, according to one or more embodiments. Transactions may be acquired from one or more systems connected in a network, as in step 202. In an example embodiment, the network may be a computer network connected over World Wide Web. The acquiring of transaction may be performed by one of comparing and/or matching an identifier of the transactions. For example, in a trade settlement, outgoing settlement transaction(s) from one or more systems and incoming settlement transaction(s) of another system of the one or more systems may be acquired. A set of configurable matching rules may be defined, as in step 202. The set of configurable matching rules may be defined during a reconciliation process. The set of configurable matching rules may be dependent on a user defined conditions. A user may define matching rules for all matching sets in the reconciliation process. All possible matching rules may be configured for all sub levels. A standard field may be used for configurable matching rules. For the set of matching rules, multi-level matching rules can be defined. The multi-level matching rules may give the flexibility to pass the transactions through multiple matching rules. The acquired transactions may be compared with the set of configurable matching rules, as in step 206. At least one rule associated with the set of configurable matching rules may be applied on the acquired transactions, as in step 208, based on the comparison of step 206. The user defined conditions may be used to decide when to apply the matching rules on the transactions. The user may decide an execution flow of the reconciliation process. The execution flow is not limited to passing an exception record to next level of the comparison and passing the transactions to the next level of the comparison. The transactions of the two or more systems may be scanned, as in step 210. A user defined function may be applied on the transactions of the two or more systems, as in step 212. A value of the user defined function may be calculated, as in step 214. The value of the user defined function may be one of a null value and/or a residual value.

Upon the value of the user defined function being the residual value, configurable criteria may be applied on the value of the user defined function, as in step 220. The configurable criteria may be defined during the reconciliation process. A residual transaction may be created in one of the systems, as in step 222. Another value of the user defined function may be recalculated, as in step 214.

Upon the value of the user defined function being the null value, the transactions may be reconciled from the two or more systems, as in step 218.

The method for reconciling transactions iteratively by segregating the data into homogenous data sets may reduce the number of exceptions reported at the end of reconciliation process.

In one or more example embodiment, multiple set of transactions may be acquired in the step 202. The comparison of the multiple set of transactions may be performed in parallel in the step 206.

Figure 3:
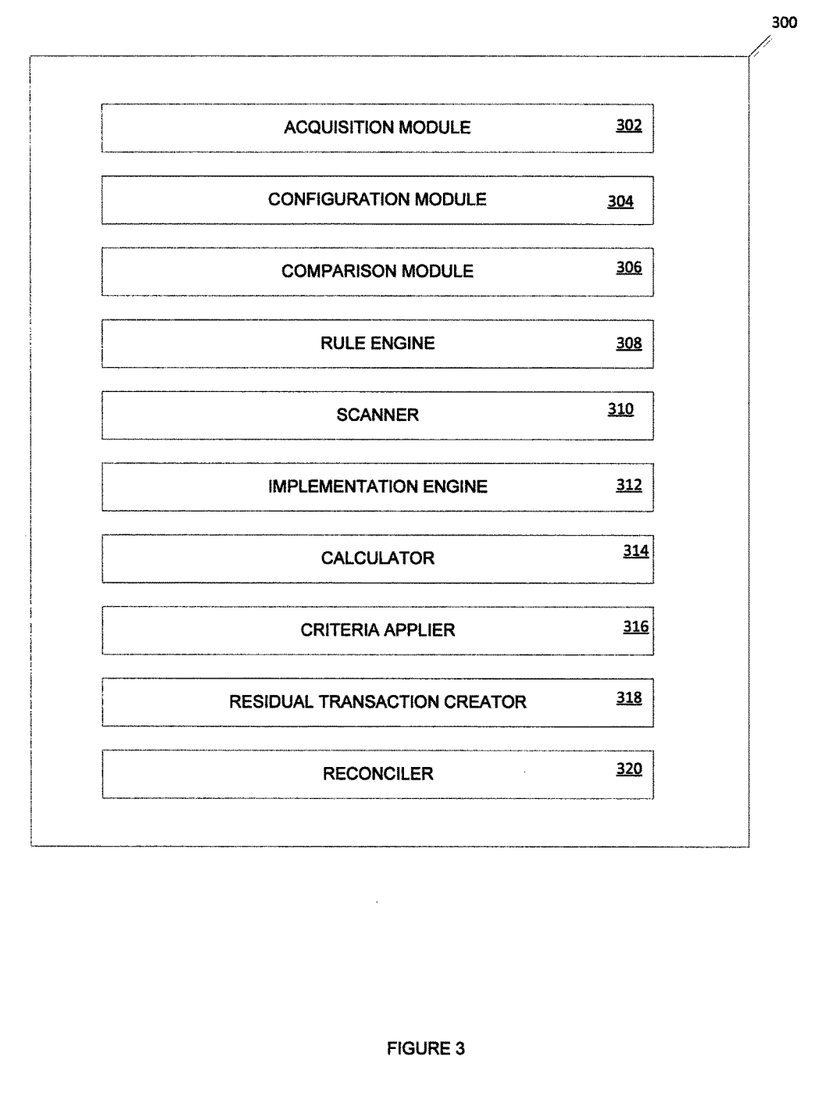
FIG. 3 is a block diagram illustrating a system for reconciling transactions iteratively by segregating the data into homogeneous data sets according to one or more embodiments.

FIG. 3 is a block diagram illustrating a system for reconciling transactions 300 iteratively by segregating the data into homogeneous data sets, according to one or more embodiments. One or more portions of the system 300 can be included in the main memory 104, static memory 106, or disk drive unit 116 of the transaction processing computing device 100, for example, and includes acquisition module 302, configuration module 304, comparison module 306, rule engine 308, scanner 310, implementation engine 312, calculator 314, criteria applier 316, residual transaction creator 318 and reconciler 320 in this particular example. The acquisition module 302 may be configured to acquire transactions from one of two systems. The acquiring of transaction(s) may be performed by one of comparing and/or matching identifiers of the transactions. For example, in a trade settlement, outgoing settlement transaction from one of the two systems and incoming settlement transaction of another system of the two systems may be acquired. The configuration module 304 may be configured to define a set of configurable matching rules. The set of configurable matching rules may be defined during a reconciliation process. The set of configurable matching rules may be dependent on user defined conditions. A user may define matching rules for all matching sets in the reconciliation process. Multiple matching rules may be configured for all sub levels. A standard field may be used for configurable matching rules. For the set of matching rules, multi-level matching rules may be defined. The multi-level matching rules may give flexibility to pass the transactions through multiple matching rules. The comparison module 306 may be configured to compare the acquired transaction(s) against the set of configurable matching rules. The rule engine 308 may be configured to apply rule(s) associated with the set of configurable matching rules based on a result of the comparison module 306. The user defined conditions may be used to decide when to apply the matching rules on the transactions. The user may decide an execution flow of the reconciliation process. The execution flow is not limited to passing an exception record to next level of the comparison and/or passing the transactions to the next level of the comparison. The scanner 310 may be configured to scan the transactions of the two or more systems. The implementation engine 312 may be configured to apply a user defined function on the transactions of the systems. The calculator 314 may be configured to calculate a value of the user defined function. The value of the user defined function may be one of a null value and/or a residual value.

Upon the value of the user defined function being the residual value, the criteria applier 316 may be configured to apply a configurable criteria on the value of the user defined function. The configurable criteria may be defined during the reconciliation process. The residual transaction creator 318 may be configured to create a residual transaction in one of the systems. Another value of the user defined function may be recalculated.

Upon the value of the user defined function being the null value, the reconciler 320 may be configured to reconcile the transactions.

In one or more example embodiment, the acquisition module 302 may acquire multiple set of transactions. The comparison 306, may compare the multiple set of transactions in parallel.

In an example embodiment, system1 and system2 may be connected in a computer network. Transactions of the system1 may be written as $$A=\{AT1, AT2, AT3 \ldots ATx\}$$

and

Transactions of the system2 may be written as $$B=\{BT1, BT2, BT3 \ldots BTy\}$$

Where,

A is a set of transactions acquired from system1;
B is a set of transactions acquired form system2;
T is a representation of the transactions;
x is a variable representing a count of the transactions in the set of transactions acquired from the system1;
y is a variable representing a count of the transactions in the set of the transactions acquired from the system2.
The transactions of the system1 may have more than one fields represented as $$a1, a2, a3 \ldots a(n-1), an$$

but not limited to the said representation where:
n is a variable representing a count of the fields of the transactions of the system1.
The transactions of the system2 may have more than one fields represented as $$b1, b2, b3 \ldots b(m-1), bm$$

but not limited to the said representation where:
m is variable representing a count of the fields of the transactions of the system2.
A reconciling field may be defined for the transactions of the system1 and the system2.
ar is a reconciling field of the transactions of the system1 where,
r is a variable having any value starting from 1 to the n.
br' is a reconciling filed of the transactions of the system2 where,
r' is a variable having any value starting from 1 to the m.
A function f1 may applied on the set of transactions of the system1 as f1 (AT1.ar, AT2.ar, . . . ATx.ar). A result of the function f1 may be calculated. A functions f2 may be applied on the set of transactions of the system as f2 (BT1.br', BT2.br', . . . BTy.br'). The result of the function f2 may be calculated. A user defined function may applied on the result of the function f2 and the function f2 as R(f1,f2). The user defined function R may be called reconciliation function.

For example, below table may give the transactions of the two systems.

TABLE 1

Sample Reconciliation Data

| Account Number | | Currency Code | | Account Balance | | Account Owner ID | |
|---|---|---|---|---|---|---|---|
| system1 | system2 | system1 | system2 | system1 | system2 | system1 | system2 |
| 1250 | 1250 | USD | USD | 120.51 | 120.51 | 6782 | 6782 |
| 1251 | 1251 | USD | USD | 1000.92 | 1001 | 6783 | 6783 |
| 1252 | 1252 | USD | USD | 2000 | 2003 | 6784 | 6784 |
| 3250 | 3250 | EUR | EUR | 500.23 | 500.23 | 6785 | 6785 |
| 3251 | 3251 | EUR | EUR | 5000.34 | 5000.97 | 6786 | 6786 |
| 3252 | 3252 | EUR | EUR | 7000 | 7001.1 | 6787 | 6787 |
| 7250 | 7250 | INR | INR | 6000.5 | 6000.5 | 6788 | 6788 |
| 7251 | 7251 | INR | INR | 10000 | 10040 | 6789 | 6789 |
| 7252 | 7252 | INR | INR | 50000.6 | 50050 | 6790 | 6790 |

In sample reconciliation data table (Table 1), account number column may be populated with account numbers related to the transactions of system1 and system2. Currency code column may be populated with currency code of the transactions of the system1 and the system2. Account balance column may be populated with account balance amount of the system1 and the system2. Account owner ID column may be populated with account owner id of the system1 and the system2.

TABLE 2

Sample Reconciliation Matching Rules

| Primary Match Matching rules between system1 and system2 | Account Number Rule1 | | |
|---|---|---|---|
| | system1 Balance | system2 Balance | Rule Match within Tolerance of 1 EUR |
| | Owner ID | Owner ID | Exact Match |
| | Rule2 | | |
| | system1 Balance | system2 Balance | Rule Match within Tolerance of 2 USD |
| | Owner ID | Owner ID | Exact Match |
| | Rule3 | | |
| | system1 Balance | system2 Balance | Rule Match within Tolerance of 45 INR |
| | Owner ID | Owner ID | Exact Match |
| Conditional Rule | If Currency code = 'EUR' then apply Rule1 Else If Currency code = 'USD' then apply Rule2 Else If Currency code = 'INR' then apply Rule3 | | |

In sample reconciliation matching rule table (Table 2), a set of configurable matching rules may be defined. The set of configurable matching rules may be dependent on a user defined conditions. The set of configurable matching rules may be configured with rule1 and/or rule2 and/or rule3. The user defined conditions may be matching the currency code with codes like 'EUR' and/or 'USD' and/or 'INR', but not limited to the said codes. If the currency code of a transaction of the system1 and the currency code of a transaction of the system2 is 'EUR', the rule1 may be applied on the transaction of the system1 and the transactions of the system2. If the currency code of the transaction of the system1 and the currency code of the transaction of the system2 is 'USD', the rule2 may be applied on the transaction of the system1 and the transactions of the system2. If the currency code of the transaction of the system1 and the currency code of the transaction of the system2 is 'INR', the rule3 may be applied on the transaction of the system1 and the transactions of the system2.

In an example embodiment, a value of the variable x be 1. A value of the variable y be 4. A value of the variable n be 5. A value of the variable m be 3.

A set of transactions of the system1, may be an outgoing settlement transaction.

$$A=\{AT1\}$$

The system1 may have reconciling fields a1, a2, a3, a4 and a5 but not limited to said reconciling fields. The reconciling field a1 may be Trade_Ref. The reconciling field a2 may be Trade_Date. The reconciling field a variable a3 may be Value_Date. The reconciling field a4 may be Trade_Amount. The reconciling field a5 may be Value_Amt. A value of the Valua_Amt may be 5000 USD. The Value_Amt may be assigned to the reconciling field a1. A function f1 may be applied on the transaction AT1. The value of the function f1 may be $$f1(AT1.ar)=f1(AT1,a5)=f1(AT1.\text{Value\_Amt})=f1(5000)=5000USD.$$

A set of transaction from the system2 may be a settlement transaction.

$$B=\{BT1,BT2,BT3,BT4\}$$

The system2 may have reconciling field b1, b2 and b3, but not limited to the said reconciling fields. The reconciling field b1 may be Trade_ref. The reconciling filed b2 may be Settle_date. The reconciling filed b3 may be Settle_Amt. Successive partial settlement transactions may have come from the system2 as shown below.

$$BT1.br'=BT1.b3=300USD;$$

$$BT2.br'=BT2.b3=500USD;$$

$$BT3.br'=BT3.b3=400USD;$$

$$BT4.br'=BT4.b3=800USD;$$

A function f2 may be applied on the transactions of the system2. In the present embodiment, the function f2, may be SUM function, but not limited to the said function. The value of the function f2 may be $$f2(BT1.b3, BT2.b3, BT3.b3, BT4.b3) =$$
$$f2(BT1.\text{Settle\_Amt}, BT2.\text{Settle\_Amt}, BT3.\text{Settle\_Amt},$$
$$BT4.\text{Settle\_Amt}) = \text{SUM}(300, 500, 400, 800) = 2000\ USD$$

A user defined function, R may be applied on the result of the function f1 and the function f2. The user defined function R, may be a reconciliation function. In an example embodiment, the reconciliation function may be defined as an exercise of finding a difference between values.

$$R(f1,f2)=\text{DIFFERENCE}(5000,2000)=3000USD.$$

Result of the user defined function may be one of a null value and/or residual value.

In the present example embodiment, the value of the user defined functions is a residual value. Configurable criteria may be applied on the value of the user defined function. Residual transaction may be created in one the systems based on a result of configurable criteria. The residual value is non-zero positive value. The residual transaction may be created in the system1. The residual transaction may be created with the reconciling value ar as the value of the residual function R. Other reconciling fields may be populated with the reconciliation fields of the set of transactions of the system1.

Further, the residual transaction may be created in system1. The transactions may be acquired form the system2. The residual transaction may be created by calculating the value of the user defined function. The value of the user defined function may be applied on the transactions and the residual transaction may be created till the value of the user defined function may be null value. The reconciliation process may be considered as complete, once the value if the user defined function is the null value and/or there are no more related transactions to be processed within the acquired data set.

In another example embodiment, an online E-Commerce shopping portal delivering ordered items to customers in staggered manner. A reconciling field ar may be a set of items ordered.

{Movie DVD,Pen Drive,CD1,CD2,CD3}

The ordered items may be delivered in 3 staggered transactions at different point of time. The order may be {Movie DVD, CD1}, {Pen Drive, CD2} and {CD3}. The residual function may be SET DIFFERENCE of items ordered and items shipped. The transactions are passed through reconciliation process. After delivering {Movie DVD, CD1}, a residual transaction may be created.

$R$={Movie DVD,Pen Drive,CD1,CD2,CD3}−{Movie DVD,CD1}

$R$={Pen Drive,CD2,CD3}

After {Pen Drive, CD2} is delivered, the residual transaction may be created.

$R$={Pen Drive,CD2,CD3}−{Pen Drive,CD2}

$R$={CD3}

After delivering {CD3}, R is a null value, the residual transaction may not be created. Upon the value R being null value, the transactions may be considered as reconciled.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry, firmware, software or any combination of hardware, firmware, and software (e.g., embodied in a machine readable medium). For example, the various electrical structure and methods may be embodied using transistors, logic gates, and electrical circuits (e.g., application specific integrated (ASIC) circuitry and/or in Digital Signal Processor (DSP) circuitry).

In addition, it will be appreciated that the various operations, processes, and methods disclosed herein may be embodied in a machine-readable medium and/or a machine accessible medium compatible with a data processing system (e.g., a computer devices), and may be performed in any order (e.g., including using means for achieving the various operations). Various operations discussed above may be tangibly embodied on a medium readable through the retail portal to perform functions through operations on input and generation of output. These input and output operations may be performed by a processor. The medium readable through the retail portal may be, for example, a memory, a transportable medium such as a CD, a DVD, a Blu-ray™ disc, a floppy disk, or a diskette. A computer program embodying the aspects of the exemplary embodiments may be loaded onto the retail portal. The computer program is not limited to specific embodiments discussed above, and may, for example, be implemented in an operating system, an application program, a foreground or background process, a driver, a network stack or any combination thereof. The computer program may be executed on a single computer processor or multiple computer processors.

Accordingly, the specification and drawings are to be regarded in an illustrative rather than a restrictive sense.

What is claimed is:

1. A method for reconciling transactions, the method comprising:
   obtaining, by a transaction processing computing device and through a computer network, at least one transaction from each of at least two systems;
   applying, by the transaction processing computing device, at least one rule of a set of configurable matching rules, the at least one rule identified based on a comparison of the at least one transaction from each of at least two systems to the set of configurable matching rules;
   determining, by the transaction processing computing device, a value of a user defined function based on an application of the user defined function to a first result from application of a first function to the at least one transaction from one of the at least two systems that matches the at least one transaction from the other one of the at least two systems based on the applying and a second result from application of a second function to the at least one transaction from the other one of the at least two systems that matches the at least one transaction from the one of the at least two systems based on the applying, wherein the value of the user defined function is one of a null value and a residual value;
   applying, by the transaction processing computing device, configurable criteria data to the value of the user defined function, creating a residual transaction in one of the systems, and recalculating another value of the user defined function, when the value of the user defined function is determined to be the residual value; and
   reconciling, by the transaction processing computing device, the transactions, when the value of the user defined function is determined to be the null value.

2. The method of claim 1, wherein the set of configurable matching rules is defined during the reconciliation of the transactions.

3. The method of claim 1, wherein the set of configurable matching rules is dependent on one or more user defined conditions.

4. The method of claim 1, wherein the configurable criteria data is defined during the reconciliation of the transactions.

5. The method of claim 1, further comprising scanning, by the transaction processing computing device, the transactions prior to determining the value of the user defined function.

6. The method of claim 1, further comprising defining, by the transaction processing computing device, the set of configurable matching rules prior to applying the at least one rule.

7. The method of claim 1, wherein the application of the first function to the transaction from one of the at least two systems further comprises applying one or more first additional functions to one or more columns or fields to the transaction from one of the at least two systems and wherein the application of the second function to the transaction from the other one of the at least two systems further comprises applying one or more second additional functions to one or more columns or fields to the transaction from the other one of the at least two systems.

8. A transaction processing computing device, comprising a processor and a memory coupled to the processor which is configured to be capable of executing programmed instructions comprising and stored in the memory to:
 obtain, through a computer network, at least one transaction from each of at least two systems;
 apply at least one rule of a set of configurable matching rules, the at least one rule identified based on a comparison of the at least one transaction from each of at least two systems to the set of configurable matching rules;
 determine a value of a user defined function based on an application of the user defined function to a first result from application of a first function to the at least one transaction from one of the at least two systems that matches the at least one transaction from the other one of the at least two systems based on the applying and a second result from application of a second function to the at least one transaction from the other one of the at least two systems that matches the at least one transaction from the one of the at least two systems based on the applying, wherein the value of the user defined function is one of a null value and a residual value;
 apply configurable criteria data to the value of the user defined function, creating a residual transaction in one of the systems, and recalculating another value of the user defined function, when the value of the user defined function is determined to be the residual value; and
 reconcile the transactions, when the value of the user defined function is determined to be the null value.

9. The transaction processing computing device of claim 8, wherein the set of configurable matching rules is defined during the reconciliation of the transactions.

10. The transaction processing computing device of claim 8, wherein the set of configurable matching rules is dependent on one or more user defined conditions.

11. The transaction processing computing device of claim 8, wherein the configurable criteria data is defined during the reconciliation of the transactions.

12. The transaction processing computing device of claim 8, wherein the processor is further configured to be capable of executing at least one additional programmed instructions comprising and stored in the memory to scan the transactions prior to determining the value of the user defined function.

13. The transaction processing computing device of claim 8, wherein the processor is further configured to be capable of executing at least one additional programmed instructions comprising and stored in the memory to define the set of configurable matching rules prior to applying the at least one rule.

14. The transaction processing computing device of claim 8, wherein the application of the first function to the transaction from one of the at least two systems further comprises applying one or more first additional functions to one or more columns or fields to the transaction from one of the at least two systems and wherein the application of the second function to the transaction from the other one of the at least two systems further comprises applying one or more second additional functions to one or more columns or fields to the transaction from the other one of the at least two systems.

15. A non-transitory computer readable medium having stored thereon instructions for reconciling transactions comprising executable code which when executed by at least one processor, causes the processor to perform steps comprising:
 obtaining, through a computer network, at least one transaction from each of at least two systems;
 applying at least one rule of a set of configurable matching rules, the at least one rule identified based on a comparison of the at least one transaction from each of at least two systems to the set of configurable matching rules;
 determining a value of a user defined function based on an application of the user defined function to a first result from application of a first function to the at least one transaction from one of the at least two systems that matches the at least one transaction from the other one of the at least two systems based on the applying and a second result from application of a second function to the at least one transaction from the other one of the at least two systems that matches the at least one transaction from the one of the at least two systems based on the applying, wherein the value of the user defined function is one of a null value and a residual value;
 applying configurable criteria data to the value of the user defined function, creating a residual transaction in one of the systems, and recalculating another value of the user defined function, when the value of the user defined function is determined to be the residual value; and
 reconciling the transactions, when the value of the user defined function is determined to be the null value.

16. The non-transitory computer readable medium of claim 15, wherein the set of configurable matching rules is defined during the reconciliation of the transactions.

17. The non-transitory computer readable medium of claim 15, wherein the set of configurable matching rules is dependent on one or more user defined conditions.

18. The non-transitory computer readable medium of claim 15, wherein the configurable criteria data is defined during the reconciliation of the transactions.

19. The non-transitory computer readable medium of claim 15, further having stored thereon instructions comprising executable code which when executed by the processor further causes the processor to perform steps further comprising scanning the transactions prior to determining the value of the user defined function.

20. The non-transitory computer readable medium of claim 15, further having stored thereon instructions comprising executable code which when executed by the processor further causes the processor to perform steps further comprising defining the set of configurable matching rules prior to applying the at least one rule.

21. The non-transitory computer readable medium of claim 15, wherein the application of the first function to the transaction from one of the at least two systems further comprises applying one or more first additional functions to one or more columns or fields to the transaction from one of the at least two systems and wherein the application of the second function to the transaction from the other one of the at least two systems further comprises applying one or more second additional functions to one or more columns or fields to the transaction from the other one of the at least two systems.

* * * * *